(No Model.)
O. ANDREWS.
FISH CUTTING BOARD.
No. 328,995. Patented Oct. 27, 1885.
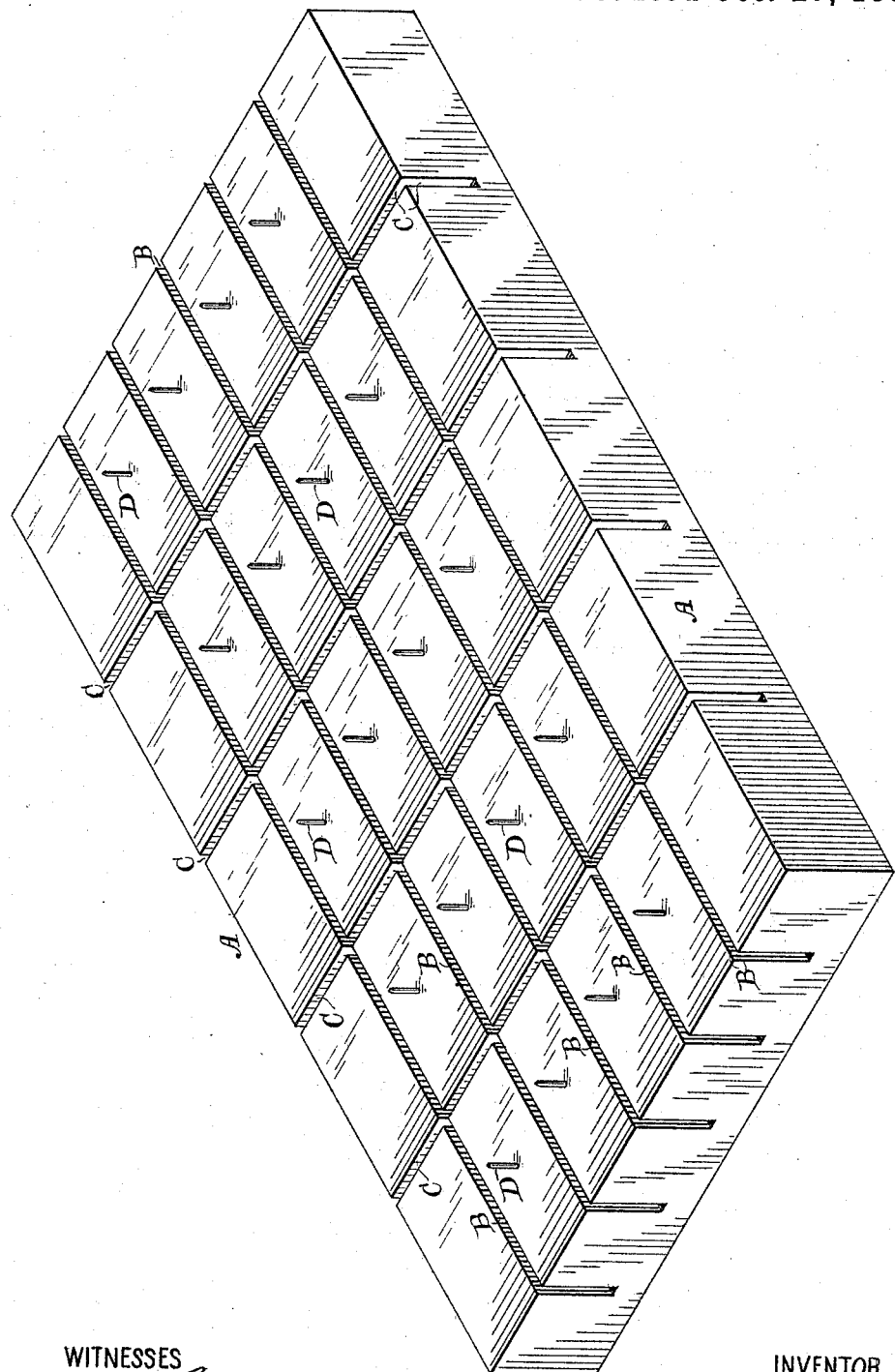
WITNESSES
INVENTOR

United States Patent Office.

OSCAR ANDREWS, OF GLOUCESTER, MASSACHUSETTS, ASSIGNOR OF THREE-FOURTHS TO JOSEPH H. ANDREWS AND WALTER S. MOSES, BOTH OF SAME PLACE, AND GEORGE TUCKER, OF ROCKPORT, MASSACHUSETTS.

FISH-CUTTING BOARD.

SPECIFICATION forming part of Letters Patent No. 328,995, dated October 27, 1885.

Application filed April 27, 1885. Serial No. 163,612. (No model.)

*To all whom it may concern:*

Be it known that I, OSCAR ANDREWS, a citizen of the United States, residing at Gloucester, in the county of Essex and State of Massachusetts, have invented a new and useful Improvement in Fish-Cutting Boards, of which the following is a specification.

My improvement relates to means, first, for holding the fish firmly on the board while being cut, and, second, for guiding the knife so that the fish will be cut into rectangular pieces of equal size, that can be piled up and fastened together so as to form rectangular blocks.

The figure is a perspective view of the cutting-board. In length and breadth it should be equal, at least, to the length and breadth of any fish to be cut up.

B B B B B are longitudinal grooves cut into the board at right angles to its surface, sufficiently deep to give direction to the knife while being drawn through the fish, and at the same time to keep the plane of the knife-blade perpendicular to the surface of the board.

C C C C are grooves of the same character as the grooves B B B B B, cut at right angles to the latter.

D D D, &c., are pins inserted into the surface of the board sufficiently deep to hold them in place and protrude above the board a half an inch, (more or less,) and serve the purpose of holding the fish firmly in place while being cut longitudinally and transversely into rectangular pieces.

Operation: First remove the skin and the larger bones and then place the fish lengthwise on the board. Press it down with the hand on the pins and cut it into longitudinal strips by drawing a knife successively through the different longitudinal grooves of the board, and then through the transverse grooves, thus cutting the fish into rectangular pieces in size equal to the rectangles of the board formed by the longitudinal and the transverse grooves. The pieces can then be piled one on another and fastened together, so as to form blocks of definite weights, and thus greatly facilitate the retailer in handling the fish, enabling it to be kept in boxes so packed as to be free from dust and the filth of insects, and greatly lessening the shrinkage.

I am aware that dies for soap-cutting machines have heretofore been provided with longitudinal and transverse grooves for the reception of the wires carried by cutting-frames, to which I make no claim.

What I claim as my invention, and desire to secure by Letters Patent, is—

The fish-cutting board A, provided with the pins D, the longitudinal grooves B, and the transverse grooves C, substantially as and for the purposes specified.

OSCAR ANDREWS.

Witnesses:
 O. D. BARRETT,
 WM. M. COLEMAN.